United States Patent
Murakami et al.

(10) Patent No.: US 12,438,697 B2
(45) Date of Patent: Oct. 7, 2025

(54) COMMUNICATION SYSTEM, INFORMATION PROCESSING APPARATUS, COMMUNICATION METHOD AND PROGRAM

(71) Applicant: NTT, Inc., Tokyo (JP)

(72) Inventors: Keizo Murakami, Tokyo (JP); Yuki Okano, Tokyo (JP); Tetsutaro Kobayashi, Tokyo (JP)

(73) Assignee: NTT, Inc., Tokyo (JP)

( * ) Notice: Subject to any disclaimer, the term of this patent is extended or adjusted under 35 U.S.C. 154(b) by 163 days.

(21) Appl. No.: 18/260,113

(22) PCT Filed: Jan. 14, 2021

(86) PCT No.: PCT/JP2021/001111
§ 371 (c)(1),
(2) Date: Jun. 30, 2023

(87) PCT Pub. No.: WO2022/153455
PCT Pub. Date: Jul. 21, 2022

(65) Prior Publication Data
US 2024/0056288 A1    Feb. 15, 2024

(51) Int. Cl.
*H04L 29/06*    (2006.01)
*H04L 9/06*    (2006.01)
*H04N 7/15*    (2006.01)

(52) U.S. Cl.
CPC ............. *H04L 9/0618* (2013.01); *H04N 7/15* (2013.01)

(58) Field of Classification Search
CPC ..... H04L 9/0618; H04L 9/0825; H04L 9/083; H04L 63/061; H04N 7/15
See application file for complete search history.

(56) References Cited

U.S. PATENT DOCUMENTS 5,963,909 A * 10/1999 Warren .................. H04B 1/665
                                                            705/52
6,192,215 B1 * 2/2001 Wang .................. A63J 19/00
                                                            40/414
(Continued)

FOREIGN PATENT DOCUMENTS

CN    106603238 B  *  6/2019
CN    111083424 A  *  4/2020  ............ H04N 21/233
(Continued)

OTHER PUBLICATIONS

Tetsutaro Kobayashi et al., "Scalable Dynamic Multi-Party Key Distribution Protocol", SCIS2016—Symposium on Cryptography and Information Security—Lecture Proceedings, The Institute of Electronics, Information and Communication Engineers (IEICE), Jan. 2016, 4E2-3.

*Primary Examiner* — Shawnchoy Rahman
(74) *Attorney, Agent, or Firm* — IPUSA, PLLC

(57) ABSTRACT

A communication system includes an information processing device that provides a video conference service; and communication terminals using the service. The information processing device records communication data related to a video conference encrypted and transmitted from each communication terminal in a first storage for the communication terminal; transmits, to the communication terminals, a ciphertext obtained by encrypting an encryption key capable of decoding each item of the communication data recorded in the first storage such that the encryption key can be decoded by the communication terminals; and transmits the communication data recorded in the first storage to the communication terminals. Each communication terminal decodes the communication data for the communication terminal using a decoding result of the ciphertext; and reproduces video and audio included in the communication (Continued)

data decoded for the communication terminal in synchronization with the others based on control data in the communication data.

6 Claims, 12 Drawing Sheets

(56) References Cited

U.S. PATENT DOCUMENTS

| | | | | |
|---|---|---|---|---|
| 8,989,377 | B2* | 3/2015 | Wang | H04N 21/234309 713/168 |
| 2003/0140227 | A1* | 7/2003 | Asano | H04L 9/0822 713/157 |
| 2004/0143732 | A1* | 7/2004 | Choi | H04N 21/23476 348/E7.056 |
| 2005/0176467 | A1* | 8/2005 | Kim | H04W 88/02 455/558 |
| 2006/0047976 | A1* | 3/2006 | Moroney | H04N 21/26613 713/193 |
| 2006/0245379 | A1* | 11/2006 | Abuan | H04L 12/1827 370/261 |
| 2007/0033418 | A1* | 2/2007 | Okawa | G06F 21/10 348/E7.071 |
| 2009/0063856 | A1* | 3/2009 | Dunn | H04L 65/403 713/160 |
| 2011/0010435 | A1 | 1/2011 | Okaya et al. | |
| 2012/0317655 | A1* | 12/2012 | Zhang | H04L 63/0464 726/28 |
| 2016/0119120 | A1* | 4/2016 | Wang | H04L 9/0618 380/30 |
| 2021/0391981 | A1 | 12/2021 | Okano et al. | |

FOREIGN PATENT DOCUMENTS

| | | | | |
|---|---|---|---|---|
| CN | 109670828 B | * | 12/2020 | ....... G06Q 20/38215 |
| JP | 2009-267562 | | 11/2009 | |
| JP | 2020-053772 | | 4/2020 | |
| WO | WO-2013047291 A1 | * | 4/2013 | ......... H04L 63/0471 |
| WO | WO-2019025762 A1 | * | 2/2019 | ......... G06F 21/6218 |
| WO | 2020/085151 | | 4/2020 | |

* cited by examiner

COMMUNICATION SYSTEM, INFORMATION PROCESSING APPARATUS, COMMUNICATION METHOD AND PROGRAM

TECHNICAL FIELD

The present invention relates to a communication system, an information processing device, a communication method, and a program.

BACKGROUND ART

As a message transmission system assumed to be used in business, there is a system that can support multiple devices such as personal computers and smartphones. Among systems that can support multiple devices, there is a cloud-based video conference system in which data is not left in communication terminals in consideration of leakage of confidential information of a company.

In such a video conference system, eavesdropping on communication paths is prevented by having the communication paths encrypted, or as described above, information leakage due to loss or unauthorized removal of a communication terminal is prevented by not leaving data in communication terminals. As such, while conventional video conference systems address threats to "communication paths" and "communication terminals", measures against threats to server devices are not sufficient.

Here, examples of a threat to a server device include "attack on a server device from the outside", "internal fraud by a server administrator", and the like.

As one measure against a threat to a server device, it is conceivable to conceal video and audio data of a video conference from a server device and implement end-to-end encrypted communication that can be decoded only by communication terminals. However, in this case, how to share a common key used between the communication terminals is an issue. A solution to this issue is disclosed in, for example, Non-Patent Literature 1. Non-Patent Literature 1 proposes a protocol in which a key (hereinafter, referred to as a "session key") is shared among users without leaking any information to an authentication server in a star-type network having the authentication server in the center.

As a result, video conference data can be exchanged between the communication terminals while the video conference data is kept secret from a server device. Furthermore, since the session key is shared so that the video conference data can be used only in the currently participating communication terminals, the session key is updated at an event such as addition or deletion of a user.

According to Patent Literature 1, there is a mechanism in which data of a server device is re-encrypted so as to be decoded using a newest session key in accordance with session key update, and a session key of the old session is shared with a communication terminal of a new session at the time of session resumption even after the session is interrupted.

CITATION LIST

Patent Literature

Patent Literature 1: JP 2020-53772 A

Non-Patent Literature

Non-Patent Literature 1: "Scalable Dynamic Multi-Party Key Distribution Protocol" by Tetsutaro Kobayashi, Kazuki Yoneyama, Reo Yoshida, Yuto Kawahara, Hitoshi Fuji, Tomohide Yamamoto, SCIS2016—Symposium on Cryptography and Information Security—Lecture Proceedings, The Institute of Electronics, Information and Communication Engineers (IEICE), January 2016, 4E2-3

SUMMARY OF INVENTION

Technical Problem

In a video conference system, a recording function is often provided by which video conference data is recorded in a server device and can be reproduced later. In the recording function, recorded data is generated by the server device that combines a plurality of items of video conference data for each of communication terminals transmitted from the communication terminals of respective participants of the video conference system into one item of data. By downloading such recorded data, the communication terminals can reproduce video data and audio data transmitted from each of the communication terminals of all the participants of the video conference at any timing after the video conference.

However, in a case where end-to-end encryption is performed in a video conference, the server device cannot combine video conference data of a plurality of the communication terminals, and thus it is difficult to implement the recording function.

The present invention has been made in view of the above points, and an object thereof is to implement a recording function of end-to-end encrypted communication data.

Solution to Problem

Therefore, in order to solve the above issues, a communication system includes an information processing device that provides a video conference service, and a plurality of communication terminals using the video conference service, in which the information processing device includes a recording unit that records communication data related to a video conference encrypted and transmitted from each of the communication terminals in a first storage unit for each of the communication terminals, a first transmission unit that transmits, to the communication terminals, a ciphertext obtained by encrypting an encryption key capable of decoding each item of the communication data recorded in the first storage unit such that the encryption key can be decoded by the communication terminals, and a second transmission unit that transmits the communication data recorded in the first storage unit to the communication terminals, and the communication terminals each include a decoding unit that decodes the communication data for each of the communication terminals using a decoding result of the ciphertext, and a reproduction unit that reproduces video and audio included in the communication data decoded for each of the communication terminals in synchronization with each other on the basis of control data included in each of the communication data, whereby implementing a recording function of end-to-end encrypted communication data.

Advantageous Effects of Invention

The recording function of end-to-end encrypted communication data can be implemented.

DESCRIPTION OF EMBODIMENTS

Figure 1:
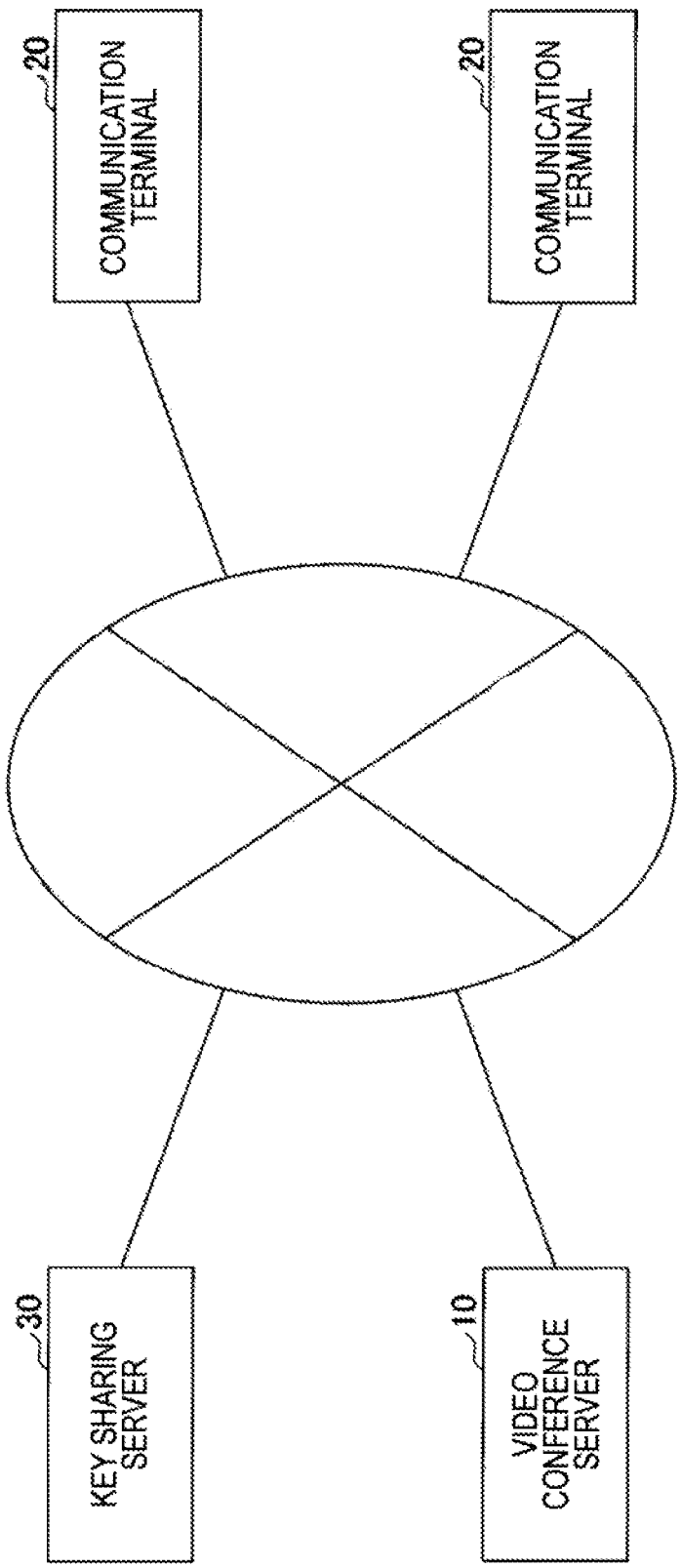
FIG. 1 is a diagram illustrating a configuration example of a video conference system in an embodiment of the present invention.

Hereinafter, an embodiment of the present invention will be described with reference to the drawings. FIG. 1 is a diagram illustrating a configuration example of a video conference system in the embodiment of the present invention. In the video conference system illustrated in FIG. 1, a key sharing server 30, a video conference server 10, and a plurality of communication terminals 20 are connected via a network such as the Internet.

The key sharing server 30 is one or more computers that function as a key sharing server in an ID-based Dynamic Multi-key Distribution Protocol (ID-DMKD protocol). The key sharing server 30 forms a star topology with the communication terminals 20 and is located at the center thereof. Note that, regarding a key sharing method, the ID-DMKD is an example, and key sharing may be implemented by another method. For example, key sharing may be implemented by a method in which one communication terminal 20 generates a key and distributes the key to the other communication terminals 20 by a public key cryptosystem. Furthermore, the star topology is not necessarily formed.

The video conference server 10 is one or more computers that provide video conference services. The video conference server 10 stores encrypted communication data (video conference data) transmitted from the communication terminals 20, and performs re-encryption at the time of updating a session key.

The communication terminals 20 are communication terminals used by users of a video conference service at the time of video conference.

Figure 2:
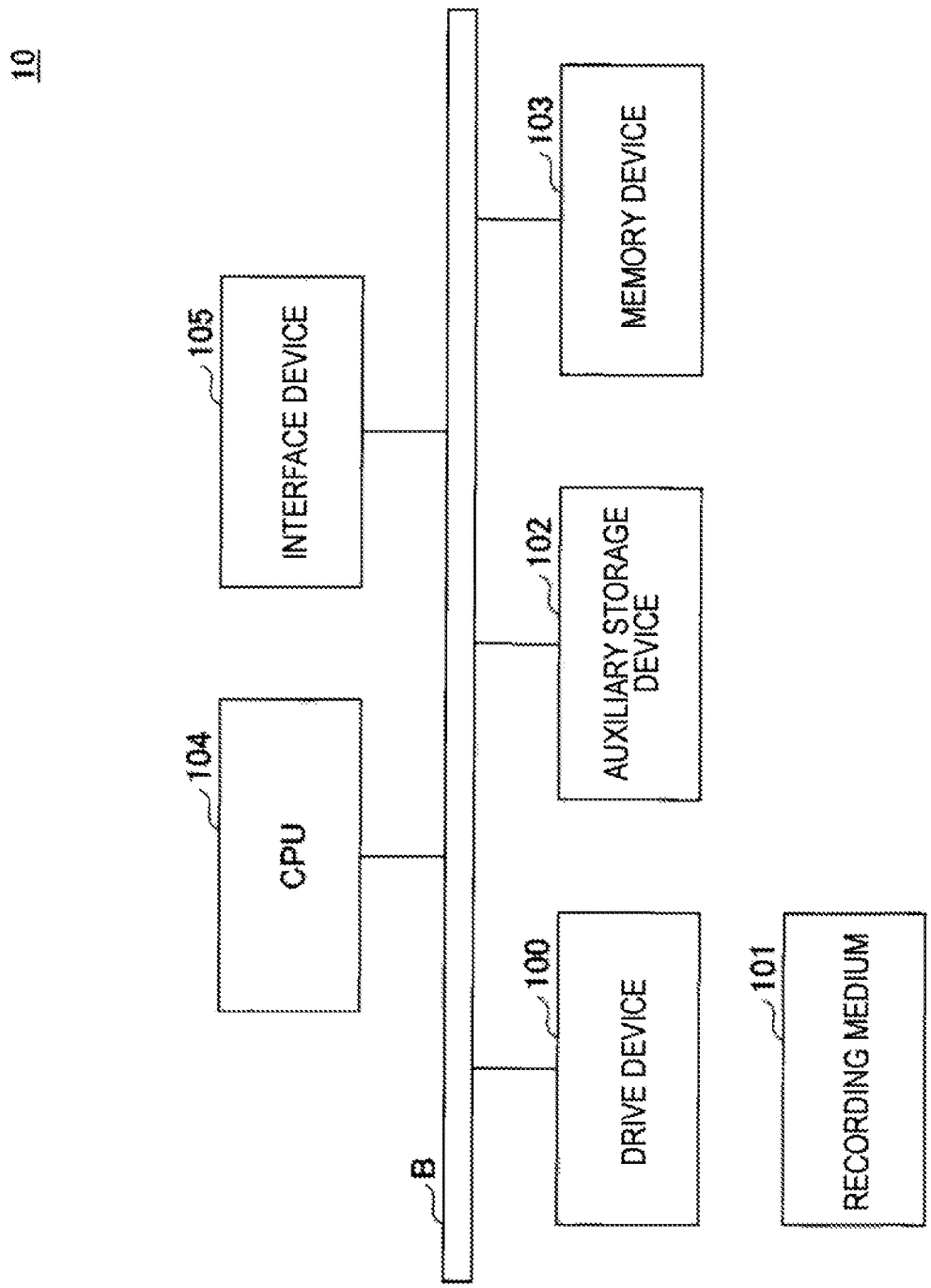
FIG. 2 is a diagram illustrating a hardware configuration example of a video conference server 10 in the embodiment of the present invention.

FIG. 2 is a diagram illustrating a hardware configuration example of the video conference server 10 in the embodiment of the present invention. The video conference server 10 in FIG. 2 includes a drive device 100, an auxiliary storage device 102, a memory device 103, a central processing unit (CPU) 104, an interface device 105, and the like that are connected to each other by a bus B.

A program for implementing processing in the video conference server 10 is provided by a recording medium 101 such as a compact disc read-only memory (CD-ROM). When the recording medium 101 storing the program is set in the drive device 100, the program is installed from the recording medium 101 to the auxiliary storage device 102 via the drive device 100. However, the program is not necessarily installed from the recording medium 101, and may be downloaded from another computer via a network. The auxiliary storage device 102 stores the installed program and also stores necessary files, data, and the like.

When an instruction to start the program is issued, the memory device 103 reads the program from the auxiliary storage device 102 and stores the program. The CPU 104 performs a function related to the video conference server 10 according to a program stored in the memory device 103. The interface device 105 is used as an interface for connecting to a network.

Figure 3:
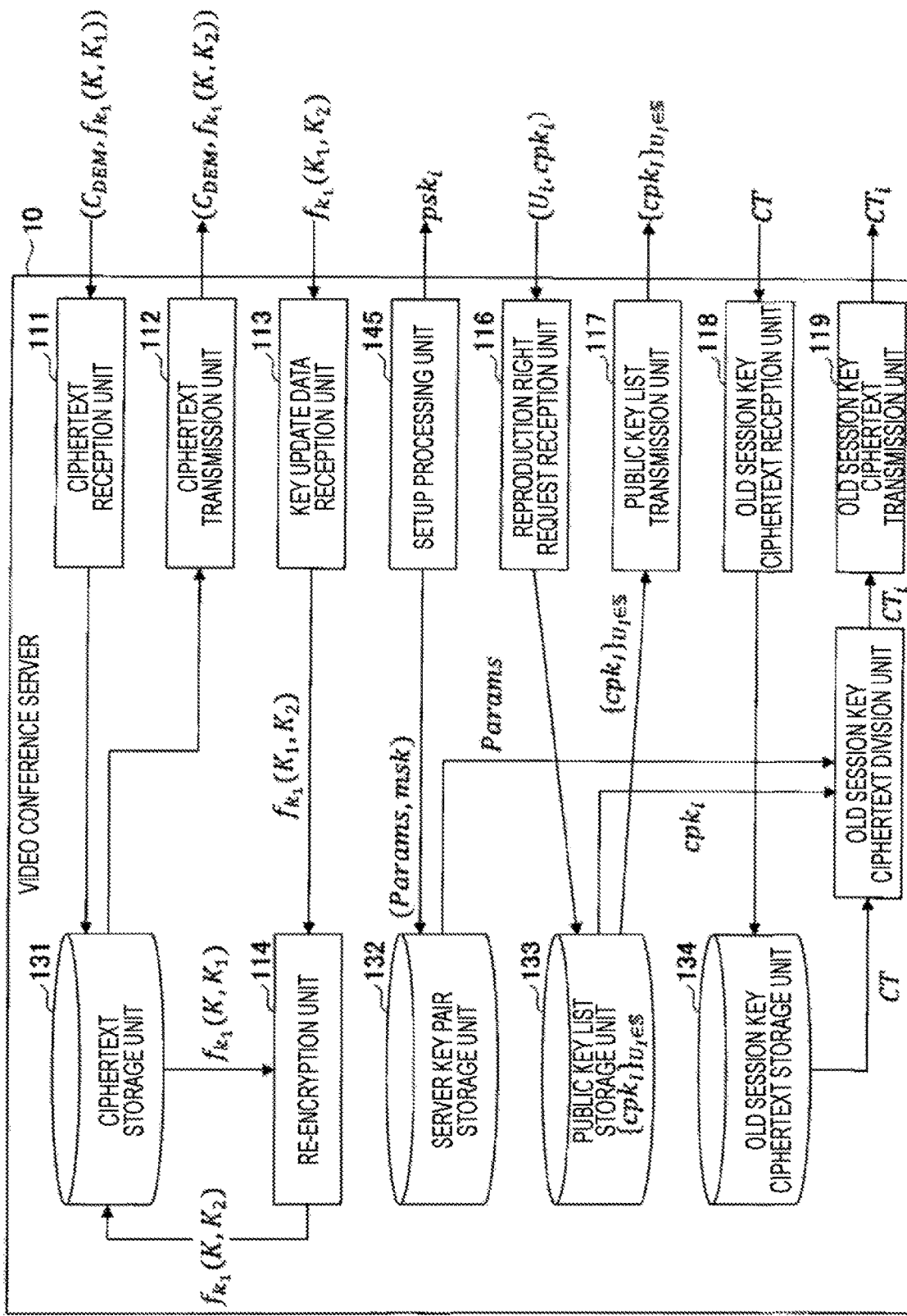
FIG. 3 is a diagram illustrating a functional configuration example of the video conference server 10 in the embodiment of the present invention.

FIG. 3 is a diagram illustrating a functional configuration example of the video conference server 10 in the embodiment of the present invention. In FIG. 3, the video conference server 10 includes a ciphertext reception unit 111, a ciphertext transmission unit 112, a key update data reception unit 113, a re-encryption unit 114, a setup processing unit 115, a reproduction right request reception unit 116, a public key list transmission unit 117, an old session key ciphertext reception unit 118, an old session key ciphertext transmission unit 119, an old session key ciphertext division unit 120, and the like. Each of these units is implemented by processing that one or more programs installed in the video conference server 10 cause the CPU 104 to perform. The video conference server 10 also uses a ciphertext storage unit 131, a server key pair storage unit 132, a public key list storage unit 133, an old session key ciphertext storage unit 134, and the like. Each of these storage units can be implemented by using, for example, the memory device 103, the auxiliary storage device 102, or a storage device connectable to the video conference server 10 via a network.

Figure 4:
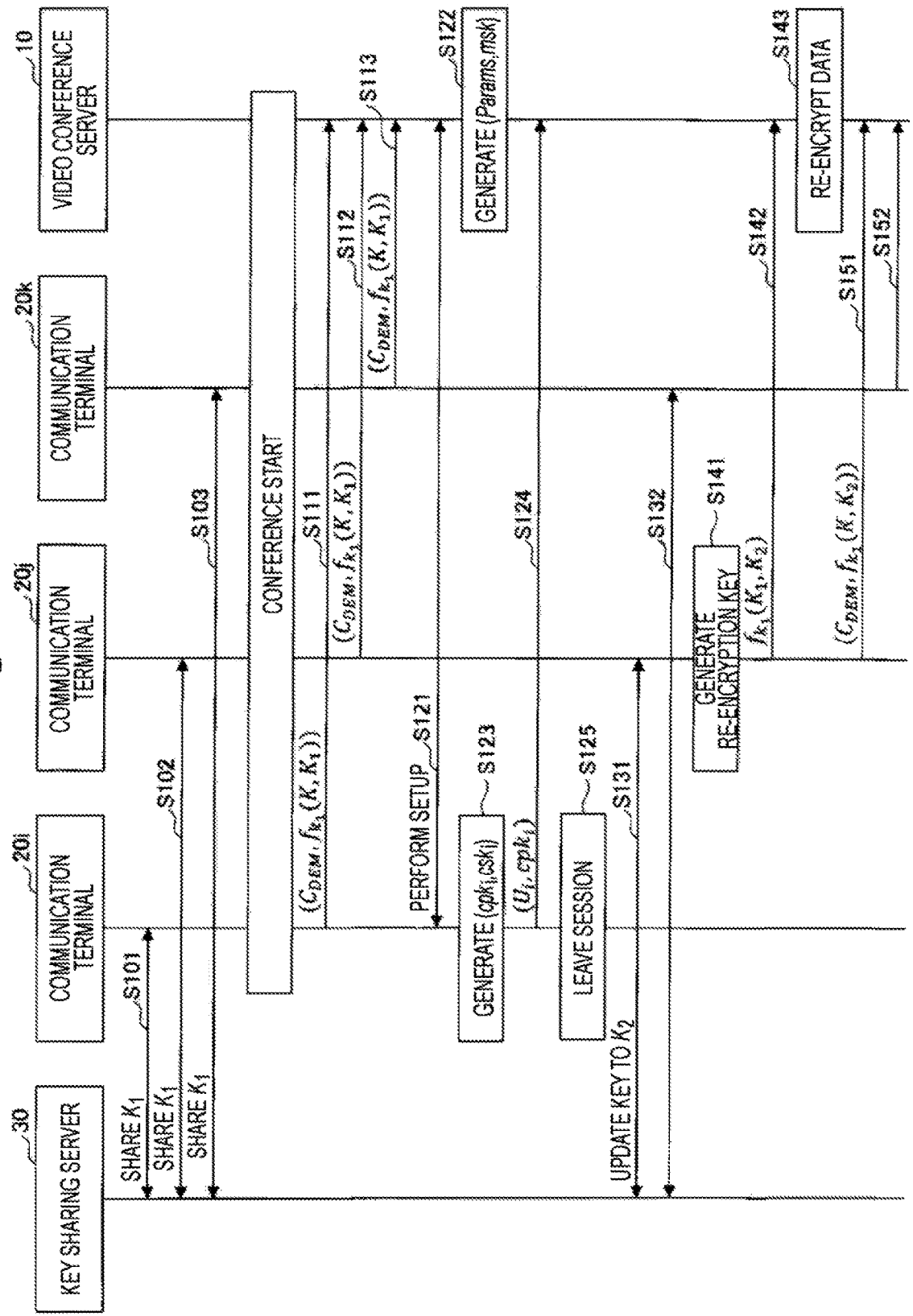
FIG. 4 is a sequence diagram for describing an example of a processing procedure performed in the video conference system.
Figure 5:
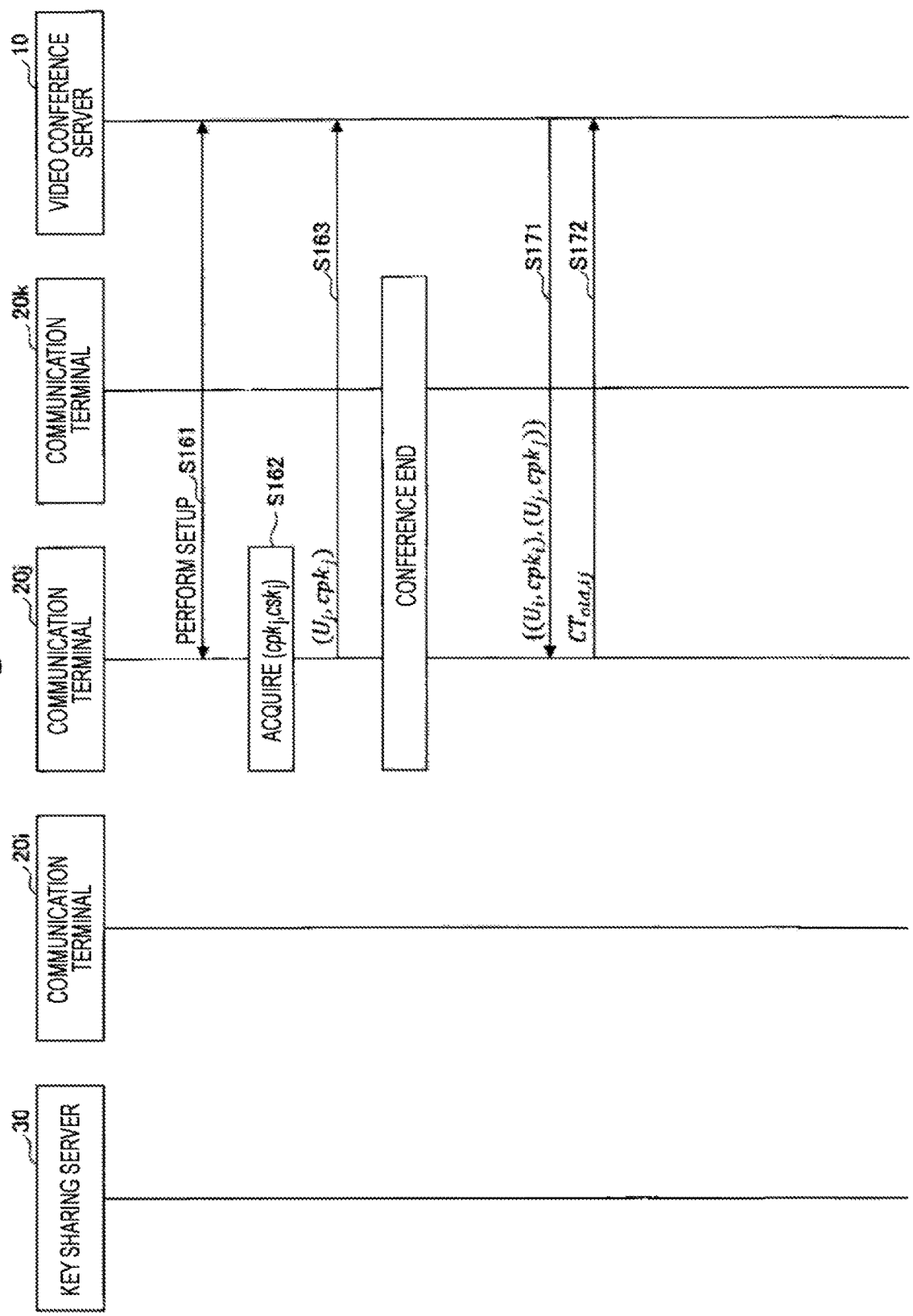
FIG. 5 is a sequence diagram for describing an example of a processing procedure performed in the video conference system.
Figure 6:
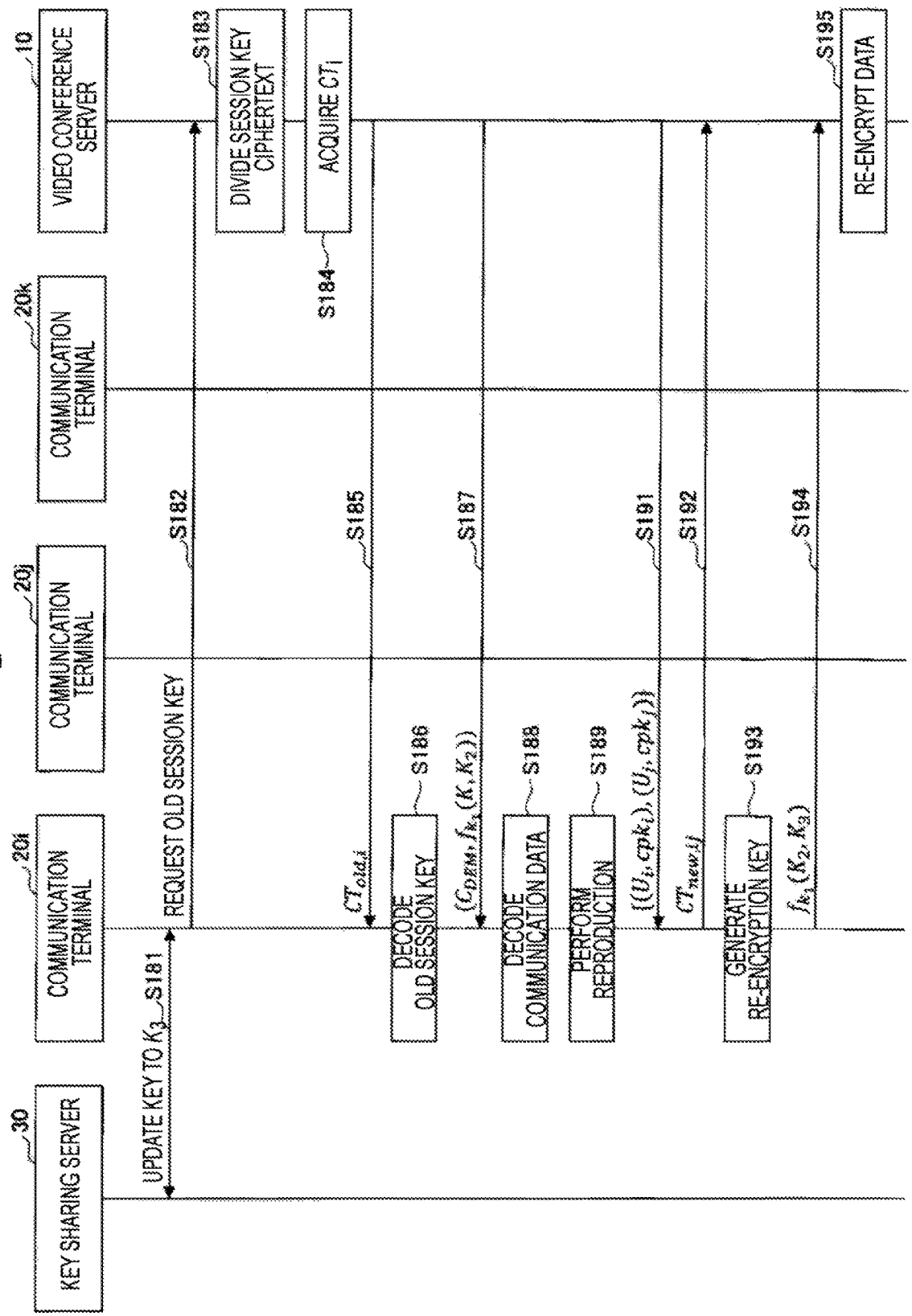
FIG. 6 is a sequence diagram for describing an example of a processing procedure performed in the video conference system.

Hereinafter, a processing procedure performed in the video conference system will be described. FIGS. 4 to 6 are sequence diagrams for describing an example of the processing procedure performed in the video conference system.

At any timing before the start of a video conference (hereinafter, simply referred to as a "conference"), each of the communication terminals 20 communicates with the key sharing server 30 device to share a session key $K_1$ (S101 to S103). Note that the session key may be shared on the basis of, for example, a method disclosed in Non-Patent Literature 1.

When the conference is started, each of the communication terminals 20 that transmits communication data acquires components of communication data using a communication data acquisition function of each of the communication terminals 20, encrypts the communication data using a transmission function of each of the communication terminals 20, and transmits a ciphertext to the video conference server 10 (S111 to S113).

Figure 7:
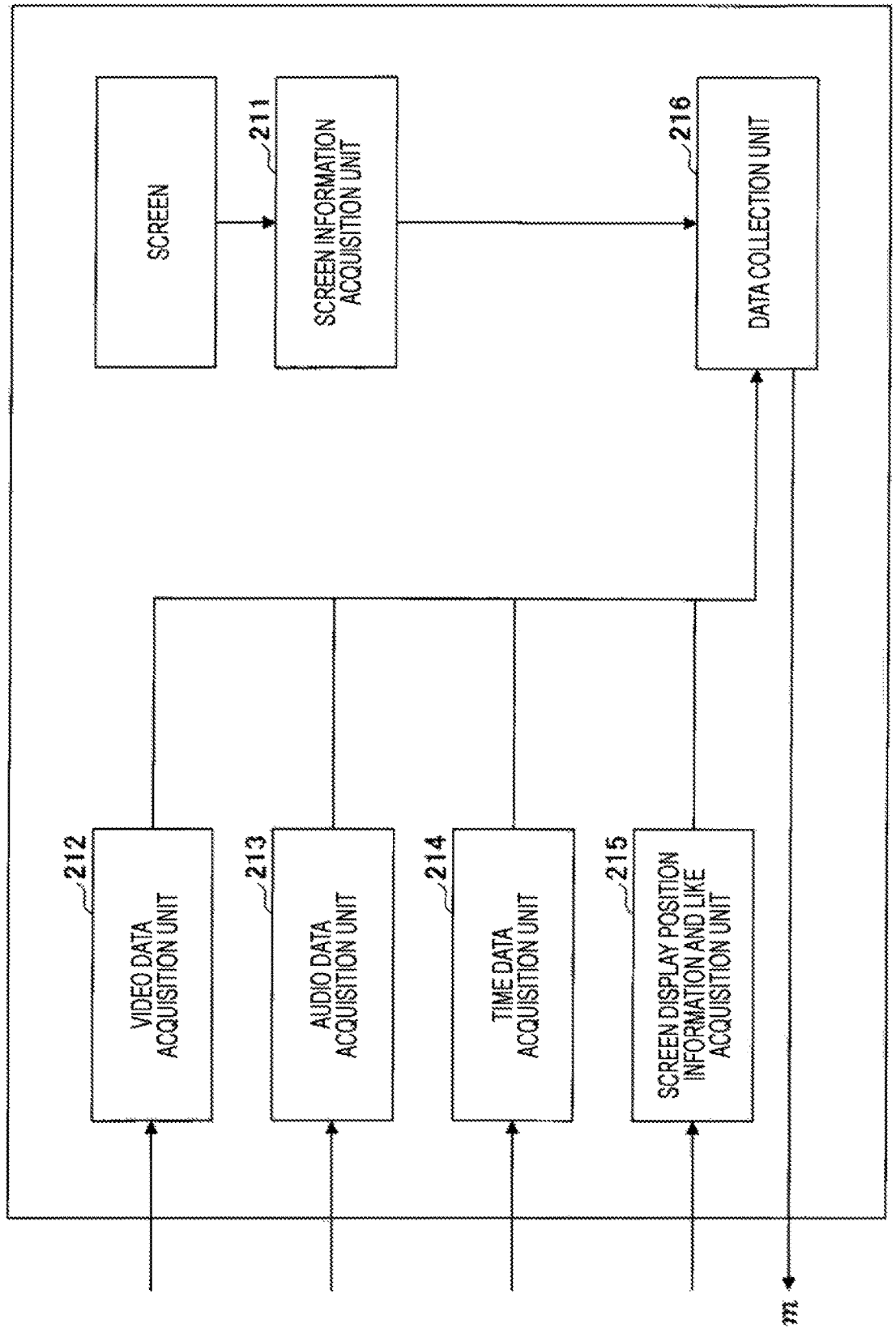
FIG. 7 is a diagram illustrating a functional configuration example of a communication data acquisition function of a communication terminal 20.

FIG. 7 is a diagram illustrating a functional configuration example of the communication data acquisition function of a communication terminal 20. As illustrated in FIG. 7, a communication terminal 20 having the communication data acquisition function includes a screen information acquisition unit 211, a video data acquisition unit 212, an audio data acquisition unit 213, a time data acquisition unit 214, a screen display position information acquisition unit 215, a data collection unit 216, and the like. Each of these units is implemented by processing that one or more programs installed in the communication terminal 20 cause the CPU in the communication terminal 20 to perform.

The communication data includes media data and control metadata. The media data includes screen sharing data, video data, and audio data. The screen sharing data refers to data indicating a screen when screen sharing or document sharing is performed, apart from video data or audio data. The video data refers to data indicating video input from a camera connected to the communication terminal 20 (for example, an image of a participant in a conference). The audio data refers to data indicating audio input from a microphone connected to the communication terminal 20 (for example, a voice uttered by a participant in a conference).

The control metadata includes time data, video on/off information, audio on/off information, screen sharing on/off information, and a display position on a screen. The time data refers to data indicating recording time of media data. Note that the time data is used for synchronization with media data of the other communication terminals 20. Therefore, the time data may have any format as long as such synchronization is possible.

The video on/off information refers to information indicating on or off of transmission (sharing) of video data. The audio on/off information refers to information indicating on or off of transmission (sharing) of audio data. The screen sharing on/off information refers to information indicating on or off of transmission (sharing) of screen sharing data. The display position on a screen refers to a display position of a document or the like that is a screen sharing target. Note that the on or off of each item of data and the display position on a screen may change with the lapse of time. Therefore, these items of data may be data including a value at each time and each time in time series.

The screen information acquisition unit 211 acquires screen sharing data and screen sharing on/off information at the time of a video conference. The video data acquisition unit 212 acquires video data at the time of a video conference. The audio data acquisition unit 213 acquires audio data at the time of a video conference. The time data acquisition unit 214 acquires time data. The screen display position information acquisition unit 215 acquires a display position on a screen and the like. The data collection unit 216 collects a data group acquired by each unit and outputs (plain text of) communication data m including the data group.

Figure 8:
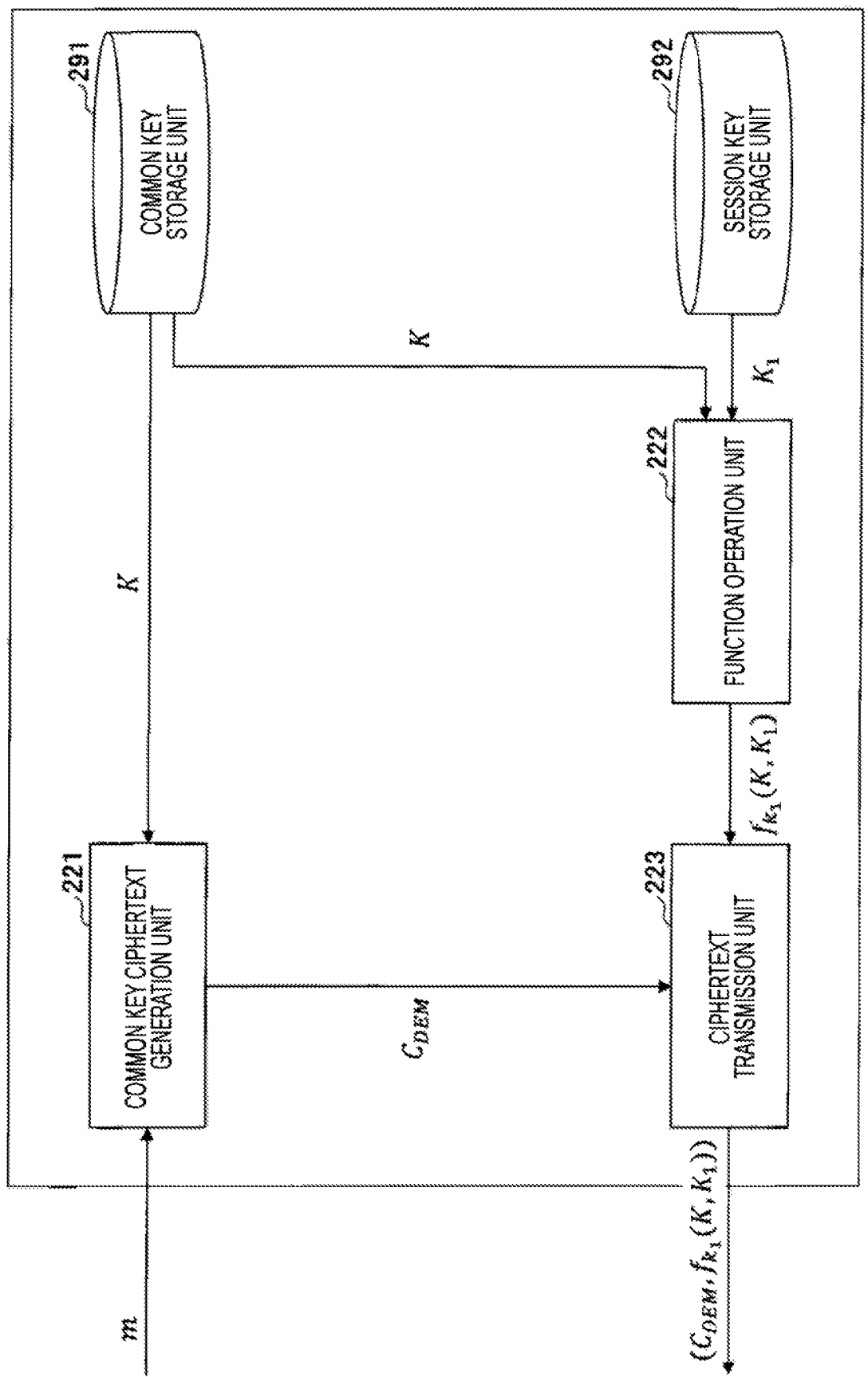
FIG. 8 is a diagram illustrating a functional configuration example of a transmission function of a communication terminal 20.

FIG. 8 is a diagram illustrating a functional configuration example of the transmission function of a communication terminal 20. As illustrated in FIG. 8, a communication terminal 20 having the transmission function includes a common key ciphertext generation unit 221, a function operation unit 222, and a ciphertext transmission unit 223. Each of these units is implemented by processing that one or more programs installed in the communication terminal 20 cause the CPU in the communication terminal 20 to perform. The communication terminal 20 having the transmission function also uses a common key storage unit 291 and a session key storage unit 292. Each of these storage units can be implemented using the memory device, the auxiliary storage device, or the like of the communication terminal 20.

The common key ciphertext generation unit 221 generates a ciphertext C_DEM by encrypting the communication data m output from the communication data acquisition function using a common key K stored in the common key storage unit 291. The common key K is shared among the communication terminals 20 by a predetermined method in advance. Note that, in the present embodiment, a notation "X_Y" (X and Y are any symbols) represents a symbol in which Y is a subscript for X in the drawings.

The function operation unit 222 performs an operation in which a function f_K_1 is applied to the session key shared in steps S101 to S103 and stored in the session key storage unit 292 and the common key K, thereby generating a ciphertext f_k_1 (K,K_1) that is a result of encrypting the common key K obtained by encrypting the communication data m using the session key at that time (K_1 at this time).

The ciphertext transmission unit 223 transmits (C_DEM, f_k_1(K,K_1)) that is a set of C_DEM generated by the common key ciphertext generation unit 221 and f_k_1(K, K_1) generated by the function operation unit 222 to the video conference server 10. That is, in steps S111 to S113, (C_DEM,f_k_1(K,K_1)) is transmitted from each of the communication terminals 20 to the video conference server 10.

When receiving (C_DEM,f_k_1(K,K_1)), the ciphertext reception unit 111 of the video conference server 10 records (C_DEM,f_k_1(K,K_1)) in the ciphertext storage unit 131. At this time, the ciphertext reception unit 111 records (C_DEM,f_k_1(K,K_1)) for each of the communication terminals 20. This is because C_DEM is encrypted and the video conference server 10 cannot perform combining.

Steps S111 to S113 are continuously performed during the conference.

Note that, during the conference, each of the communication terminals 20 can obtain communication data m from the other communication terminals 20 by receiving (C_DEM,f_k_1(K,K_1)) of the other communication terminals 20 from the video conference server 10, decoding f_k_1(K,K_1) using the session key K_1 at that time, and decoding C_DEM using the obtained common key K.

Thereafter, for example, in a case where a communication terminal 20i leaves the session (conference) in the middle of the conference and a user U_i of the communication terminal 20i desires to reproduce recorded contents after the end of the conference, reproduction right request processing (S121 to S124) is performed. The reproduction right refers to a right to decode and reproduce communication data related to a conference at any time point after the end of the conference. In the reproduction right request processing, a reproduction right request function of a communication terminal 20 is used.

Figure 9:
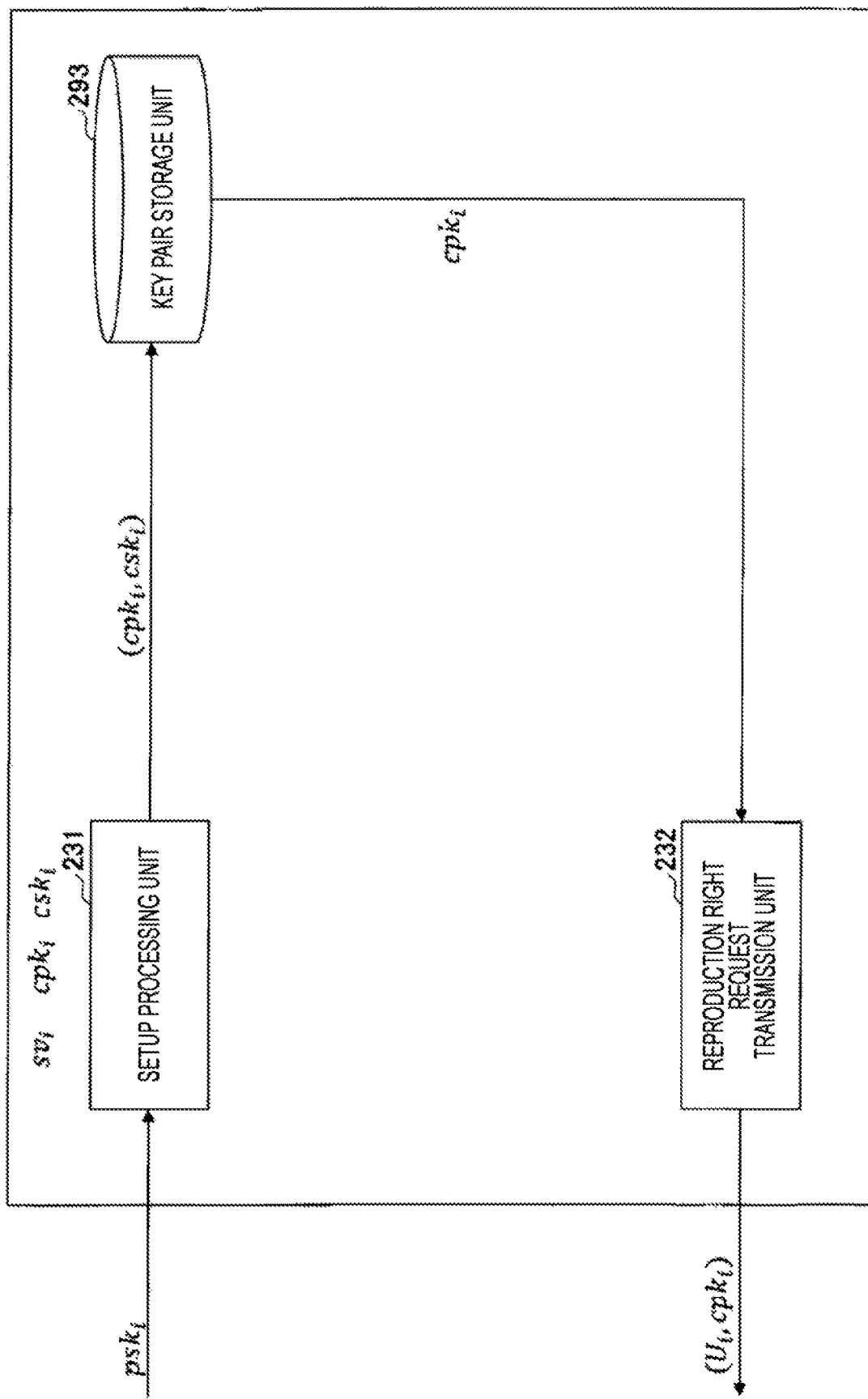
FIG. 9 is a diagram illustrating a functional configuration example of a reproduction right request function of a communication terminal 20.

FIG. 9 is a diagram illustrating a functional configuration example of the reproduction right request function of a communication terminal 20. As illustrated in FIG. 9, the reproduction right request function includes a setup processing unit 231 and a reproduction right request transmission unit 232. Each of these units is implemented by processing that one or more programs installed in the communication terminal 20 cause the CPU in the communication terminal 20 to perform. The communication terminal 20 also uses a key pair storage unit 293. The key pair storage unit 293 can be implemented, for example, using the memory device, the auxiliary storage device, or the like of the communication terminal 20.

In step S121 (FIG. 4), the setup processing unit 231 performs setup processing (preliminary preparation processing) with the setup processing unit 115 of the video conference server 10 (FIG. 3). In the setup processing, the setup processing unit 115 of the video conference server 10 (FIG. 3) generates a public key Params and a secret key msk for the video conference server 10, and records the public key Params and the secret key msk in the server key pair storage unit 132 (S121). The setup processing unit 115 also inputs the public key Params, the secret key msk, and an identifier (hereinafter, referred to as an "ID") U_i of the communication terminal 20i to a partial secret key derivation algorithm to generate a partial secret key psk_i, and transmits the partial secret key psk_i to the communication terminal 20i (S122).

On the other hand, when receiving the partial secret key psk_i from the video conference server 10, the setup processing unit 231 of the communication terminal 20i (FIG. 9) inputs the public key Params, the partial secret key psk_i, and a secret value to a complete secret key generation algorithm to generate a complete secret key csk_i and a complete public key cpk_i, and records a set of the complete secret key csk_i and the complete public key cpk_i in the key pair storage unit 293 (S123).

Subsequently, the reproduction right request transmission unit 232 of the communication terminal 20i transmits a reproduction right request including the complete public key cpk_i and the ID of the communication terminal 20i (U_i) to the video conference server 10 (S124). When receiving the reproduction right request, the reproduction right request reception unit 116 of the video conference server 10 (FIG. 3) records cpk_i of the communication terminal 20i included in the reproduction right request in the public key list storage unit 133 in association with U_i. By having cpk_i recorded in the public key list storage unit 133 in association with U_i, the video conference server 10 stores that the communication terminal 20i has requested a reproduction right.

Thereafter, the communication terminal 20i leaves the session (video conference) (S125).

In response to the leave of the communication terminal 20i (leave of the participant member U_i), the other communication terminals 20 communicate with the key sharing server 30 device, update the session key, and share the updated session key K_2 (S131, S132). The updated session key K_2 is stored in the session key storage unit 292 of each of the other communication terminals 20. Note that the session key may be updated at other timing such as addition of a participant member or the lapse of a certain period of time.

When the session key is updated, key update processing (S141 to S143) is performed. In the key update processing, a key update function of one of the communication terminals 20 including the updated session key K_2 (communication terminal 20j in FIG. 4) is used.

Figure 10:
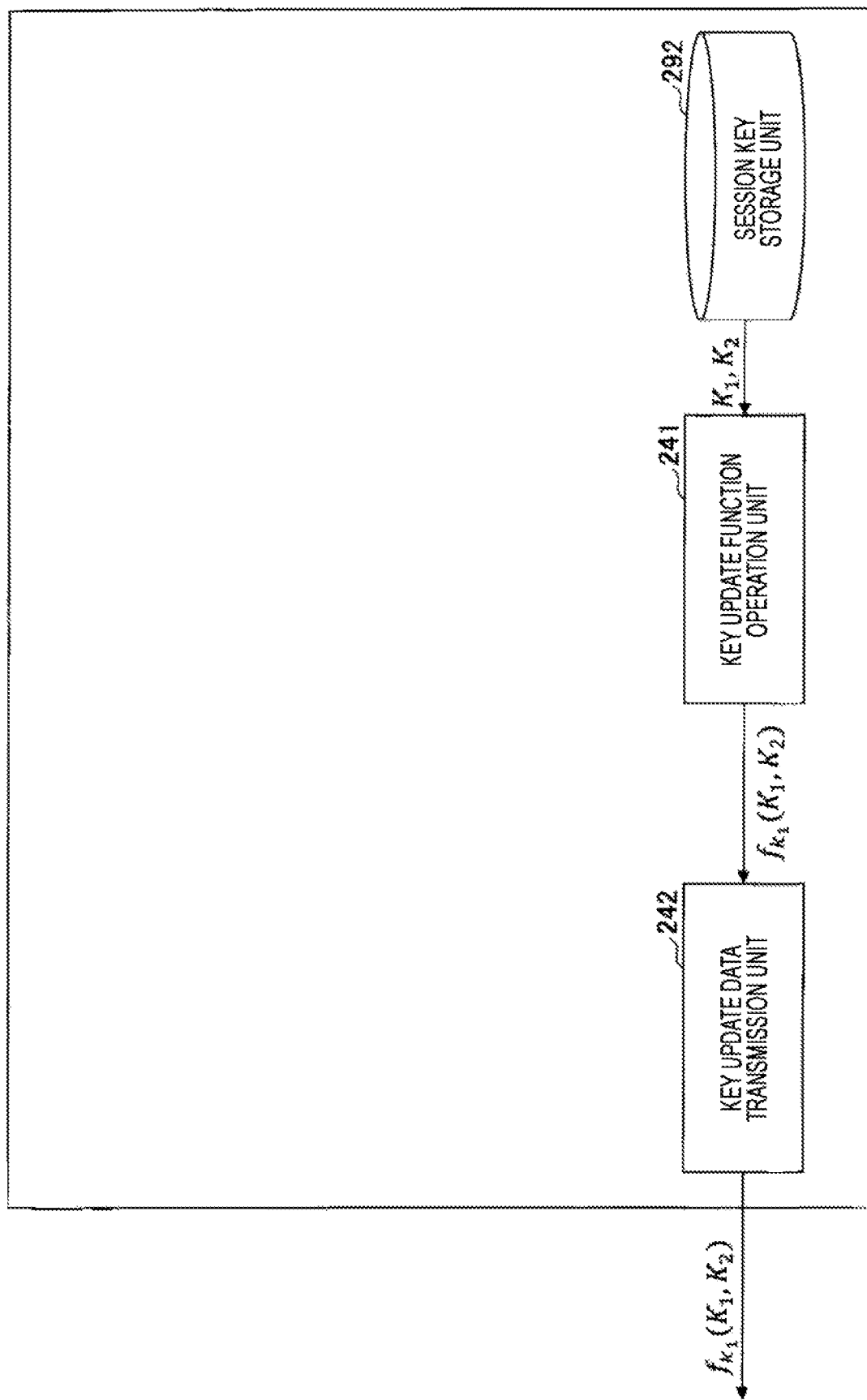
FIG. 10 is a diagram illustrating a functional configuration example of a key update function of a communication terminal 20.

FIG. 10 is a diagram illustrating a functional configuration example of the key update function of a communication terminal 20. As illustrated in FIG. 10, the key update function includes a key update number operation unit 241 and a key update data transmission unit 242.

The key update number operation unit 241 performs an operation in which the function f_K_1 is applied to the session key K_1 and the session key K_2 stored in the session key storage unit 292, thereby generating a re-encryption key f_k_1(K_1,K_2) that is a result of the operation (result obtained by encrypting the unupdated session key K_1 using the updated session key K_2) (S141).

Subsequently, the key update data transmission unit 242 transmits the re-encryption key f_k_1(K_1,K_2) to the video conference server 10 (S142).

When the key update data reception unit 113 of the video conference server 10 (FIG. 3) receives the re-encryption key f_k_1(K_1,K_2), the re-encryption unit 114 (FIG. 3) re-encrypts f_k_1(K,K_1) of each item of the recorded data (C_DEM,f_k_1(K,K_1)) recorded for each of the communication terminals 20 in the ciphertext storage unit 131 into f_k_1(K,K_2) using f_k_1(K_1,K_2) (S143). As a result, each item of the recorded data (C_DEM,f_k_1(K,K_1)) is updated to (C_DEM,f_k_1(K,K_2)), and can be decoded only by the updated session key K_2. Note that the re-encryption is described in detail in Patent Literature 1.

Thereafter, the conference is continued using the updated session key K_2. That is, the session key K_2 is used instead of the session key K_1, and processing similar to steps S112 and S113 is performed, and (C_DEM,f_k_1(K,K_2)) of each of the communication terminal 20j and a communication terminal 20k is recorded (video recorded) in the ciphertext storage unit 131 of the video conference server 10 for each of the communication terminals 20 (S151, S152).

Furthermore, in a case where a user U_j of the communication terminal 20i desires to reproduce recorded contents after the end of the conference, reproduction right request processing (S161 to S163 in FIG. 5) is performed similarly to steps S121 to S124 when the conference ends. As a result, (U_j,cpk_j) is recorded in the public key list storage unit 133 of the video conference server 10. However, since Params and msk have already been generated in step S122, the video conference server 10 does not need to generate Params and msk again.

Furthermore, when the conference (session) ends and all members leave the conference, an old session key encryption function of the communication terminal 20j as a representative performs old session key ciphertext generation processing. Note that the representative communication terminal 20 is randomly determined, for example.

Figure 11:
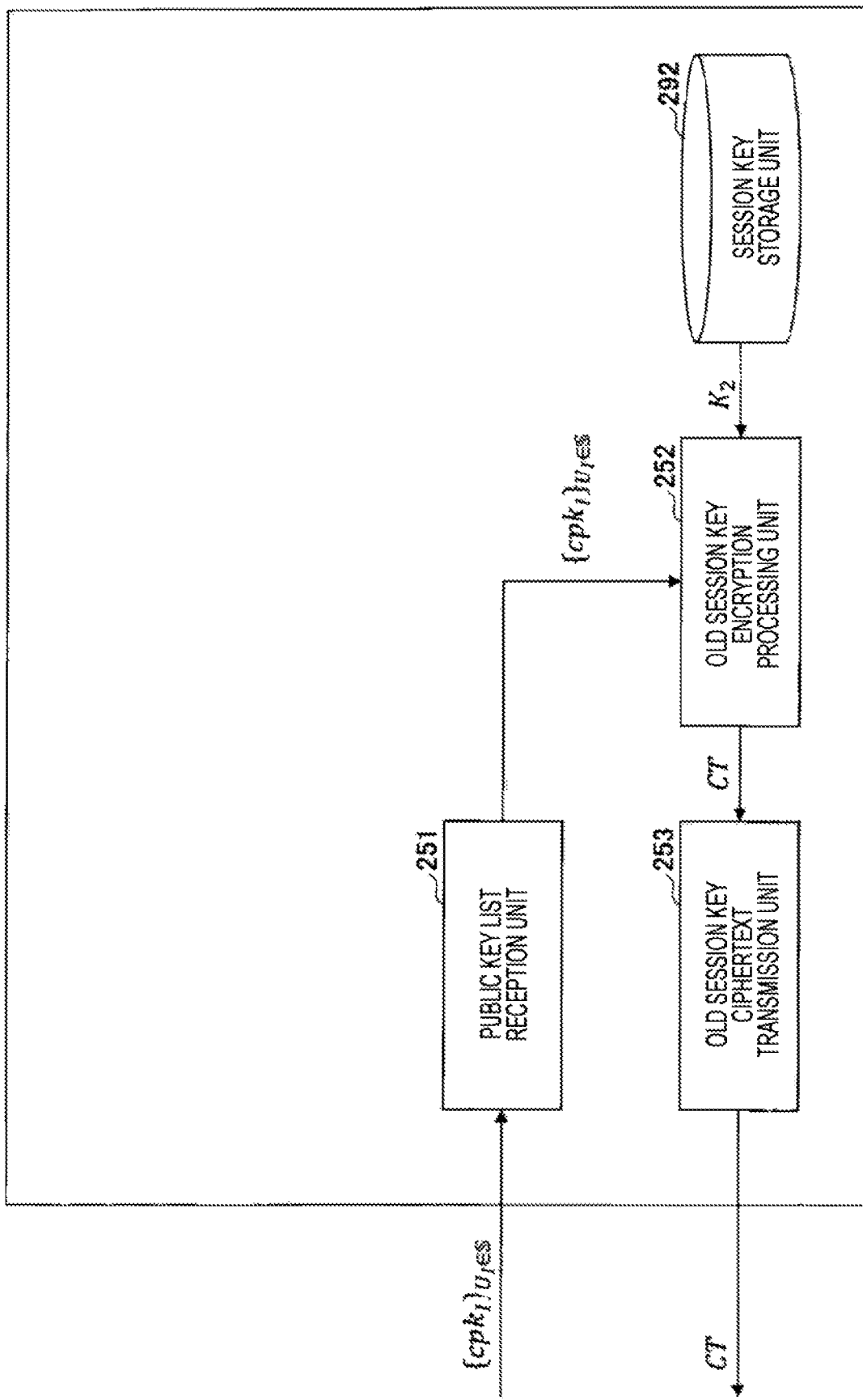
FIG. 11 is a diagram illustrating a functional configuration example of an old session key encryption function of a communication terminal 20.

FIG. 11 is a diagram illustrating a functional configuration example of the old session key encryption function of a communication terminal 20. As illustrated in FIG. 11, the old session key encryption function includes a public key list reception unit 251, an old session key encryption processing unit 252, and an old session key ciphertext transmission unit 253.

The public key list reception unit 251 receives a list of complete public keys {(U_i,cpk_i), (U_j,cpk_j)} stored in the public key list storage unit 133 of the video conference server 10 in the reproduction right request processing performed in the conference from the public key list transmission unit 117 of the video conference server 10 (S171), and inputs the list of the complete public keys to the old session key encryption processing unit 252. Note that, in the present embodiment, since the communication terminal 20i related to U_i and the communication terminal 20j related to U_j perform the reproduction right request processing (reproduction rights are requested), (U_i,cpk_i) and (U_j,cpk_j) are included in the list.

The old session key encryption processing unit 252 inputs {(U_i,cpk_i), (U_j,cpk_j)} and the session key K_2 at the end of the conference to an encryption algorithm, thereby generating a ciphertext CT_old,ij that is a result obtained by encrypting the session key K_2 using {(U_i,cpk_i), (U_j, cpk_j)}.

In step S172, the old session key ciphertext transmission unit 253 transmits the ciphertext CT_old,ij to the video conference server 10. Note that the ciphertext CT_old,ij is data associated with a list of IDs {U_i,U_j}. When receiving the ciphertext CT_old,ij, the old session key ciphertext reception unit 118 of the video conference server 10 records the ciphertext CT_old,ij in the old session key ciphertext storage unit 134.

Thereafter, when the user U_i inputs an instruction to reproduce the recorded contents of the conference to the communication terminal 20i, the communication terminal 20i communicates with the key sharing server 30 to start a new session, and generates a new session key K_3 (S181 in FIG. 6). The session key K_3 is recorded in the session key storage unit 292 of the communication terminal 20i.

Subsequently, the communication terminal 20i performs reproduction processing using a reproduction function.

Figure 12:
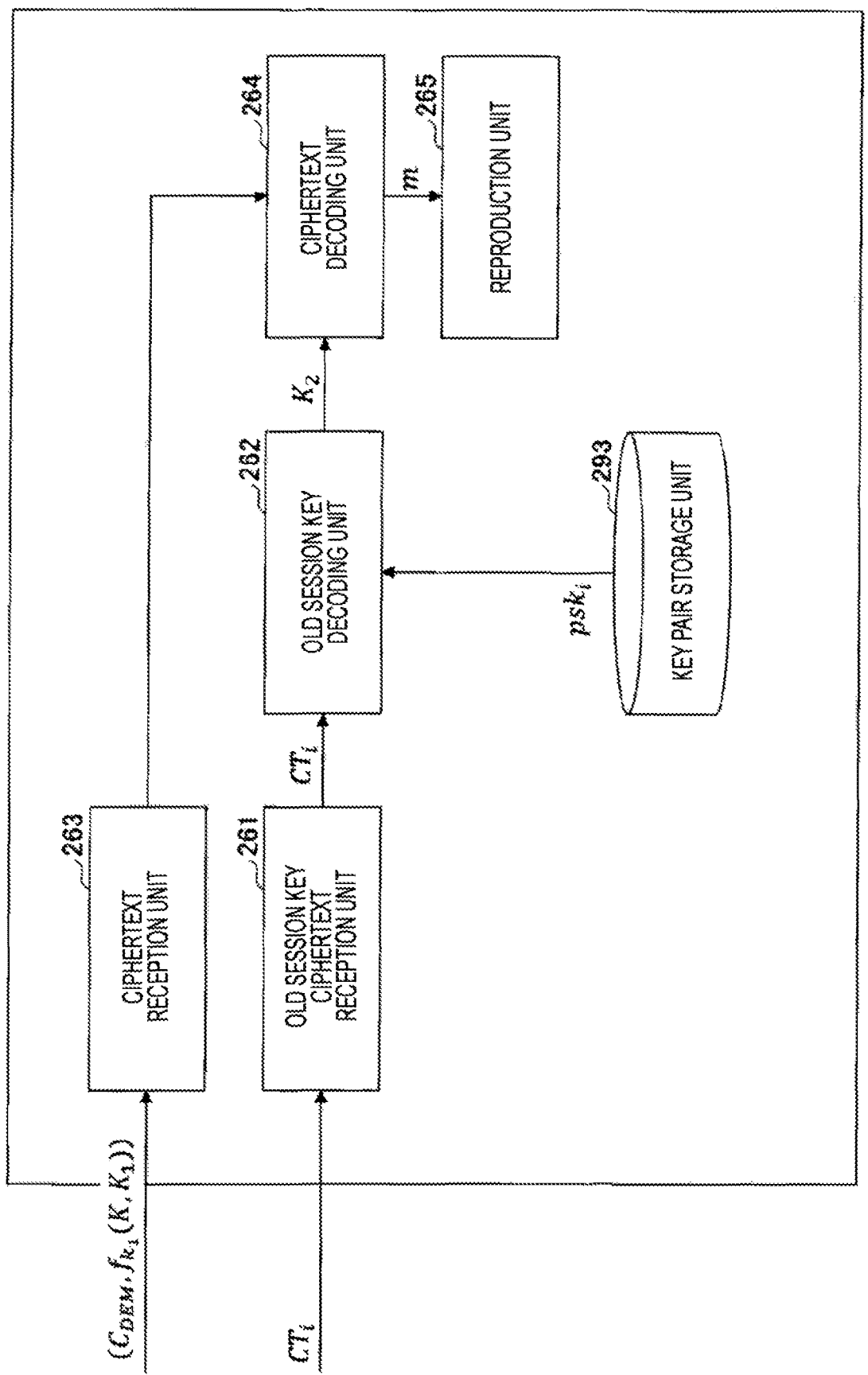
FIG. 12 is a diagram illustrating a functional configuration example of a reproduction function of a communication terminal 20.

FIG. 12 is a diagram illustrating a functional configuration example of the reproduction function of a communication terminal 20. As illustrated in FIG. 12, a communication terminal 20 having the reproduction function includes an old session key ciphertext reception unit 261, an old session key decoding unit 262, a ciphertext reception unit 263, a ciphertext decoding unit 264, and a reproduction unit 265. Each of these units is implemented by processing that one or more programs installed in the communication terminal 20 cause the CPU in the communication terminal 20 to perform.

In step S182, the old session key ciphertext reception unit 261 requests the video conference server 10 for the encrypted old session key.

When the old session key ciphertext transmission unit 119 of the video conference server 10 (FIG. 3) receives the request for the encrypted old session key, the old session key ciphertext division unit 120 (FIG. 3) searches for CT_old associated with the ID of the communication terminal 20i (U_i), and in a case where there is applicable CT_old, converts CT_old (in the present embodiment, CT_old,ij) into CT_old,i so that decoding can be performed only using the secret key csk_i of the communication terminal 20i (that is, only using the communication terminal 20i) (S183, S184). That is, the old session key ciphertext division unit 120 divides CT_old,ij and generates a portion corresponding to U_i as CT_old,i. Note that the division of a ciphertext may be performed using, for example, a method disclosed in Patent Literature 1. The old session key ciphertext transmission unit 119 transmits CT_old,i that is data after conversion to the communication terminal 20i (S185).

When the old session key ciphertext reception unit 261 receives CT_old,i, the old session key decoding unit 262 decodes CT_old,i using the secret key csk_i of the communication terminal 20i to obtain K_2 (S186).

Subsequently, when the ciphertext reception unit 263 receives each item of (C_DEM,f_k_1(K,K_2)) recorded in the ciphertext storage unit 131 for each of the communication terminals 20 from the ciphertext transmission unit 112 (S187), the ciphertext decoding unit 264 decodes each item of (C_DEM,f_k_1(K,K_2)) using K_2 to obtain each item of the communication data m (for example, m_i, m_j, and m_k) (S188). More specifically, the ciphertext decoding unit 264 decodes K from f_k_1(K,K_2) using K_2, and decodes C_DEM to the m using the decoded K. Note that m_i is communication data m of the communication terminal 20i. m_j is communication data m of the communication terminal 20j. m_k is communication data m of the communication terminal 20k.

Subsequently, the reproduction unit 265 reproduces media data included in each item of the communication data m according to control metadata included in each item of the communication data m (m_i, m_j, and m_k). That is, the reproduction unit 265 synchronizes each item of the communication data m on the basis of time data included therein, and reproduces the media data included therein. At this time, the reproduction unit 265 controls on or off of each item of the media data on the basis of on/off information included in each item of the communication data. Furthermore, the reproduction unit 265 also reproduces a display position of a document or the like that is a screen sharing target on the basis of a display position on a screen included in the control metadata of each item of the communication data m. That is, the reproduction unit 265 synthesizes each item of the communication data recorded in the video conference server 10 for each of the communication terminals 20. As a result, the user U_i of the communication terminal 20i can check the state of the conference in a form similar to that during the conference. That is, the user U_i can substantially use a recording function.

Subsequently, processing for preventing the communication data on the video conference server 10 from being decoded even if the old session key K_2 is leaked is performed.

First, the public key list transmission unit 117 of the video conference server 10 transmits a list of public keys {cpk_i, cpk_j} stored in the public key list storage unit 133 to the communication terminal 20i (S191).

When receiving the list of the public keys {cpk_i,cpk_j}, the public key list reception unit 251 of the communication terminal 20i (FIG. 11) inputs the list of the public keys to the old session key encryption processing unit 252. The old session key encryption processing unit 252 inputs {(U_i, cpk_i), (U_j,cpk_j)} and the current session key K_3 to an encryption algorithm, thereby generating a ciphertext CT_new,ij that is a result obtained by encrypting the session key K_3 using {(U_i,cpk_i), (U_j,cpk_j)}. In step S192, the old session key ciphertext transmission unit 253 transmits the ciphertext CT_new,ij to the video conference server 10.

When receiving the ciphertext CT_new,ij, the old session key ciphertext reception unit 118 of the video conference server 10 records the ciphertext CT_new,ij in the old session key ciphertext storage unit 134.

Subsequently, when the key update number operation unit 241 of the communication terminal 20i generates a re-encryption key f_k_1(K_2,K_3) from K_2 and K_3 (S193), the key update data transmission unit 242 transmits the re-encryption key f_k_1(K_2,K_3) to the video conference server 10 (S194).

When the key update data reception unit 113 of the video conference server 10 (FIG. 3) receives the re-encryption key f_k_1(K_2,K_3), the re-encryption unit 114 (FIG. 3) re-encrypts f_k_1(K,K_2) of each item of the recorded data (C_DEM,f_k_1(K,K_2)) recorded in the ciphertext storage unit 131 into f_k_1(K,K_3) using f_k_1(K_2,K_3) (S195). As a result, each item of the recorded data (C_DEM,f_k_1 (K,K_2)) is updated to (C_DEM,f_k_1(K,K_3)), and can be decoded only by the updated session key K_3.

Note that steps S191 to S195 may be performed in parallel with steps S181 to S189.

As described above, according to the present embodiment, when recorded data of each of the communication terminals 20 encrypted using a session key and recorded in the video conference server 10 is reproduced in a certain communication terminal 20, the video conference server 10 transmits a ciphertext in which the session key capable of decoding the communication data is encrypted such that the certain communication terminal 20 can perform decoding and each item of the recorded data to the certain communication terminal 20. As a result, the certain communication terminal decodes each item of the recorded data and reproduces each item of the recorded data on the basis of each item of media data included in each decoding result and each item of control metadata included in each decoding result, so that each item of the media data can be reproduced in synchronization with each other. Therefore, the communication data recording function can be implemented while the contents of the communication data is concealed from a via-point of the communication data (video conference server 10).

Furthermore, according to the present embodiment, only a communication terminal 20 that has requested a reproduction right can decode recorded data. As a result, for example, in a video conference in which an unspecified person can participate, the recorded contents of the entire video conference can be prevented from being viewed by a participant who has been forced to leave in the middle as recognized as an unauthorized person. Note that, at the time of requesting a reproduction right, the video conference server 10 may authenticate a user of the communication terminal 20 that is a request source of the reproduction right. By doing so, an unauthorized person can be prevented from requesting a reproduction right.

Note that, in Non-Patent Literature 1, since a session key is shared only by current participating members, the session key may be updated in accordance with addition or deletion of a user such as a login or logout event, or may additionally be periodically updated. According to Patent Literature 1, data can be re-encrypted and a session key can be shared asynchronously with a communication terminal 20 of a new session in accordance with session key update, but there is an issue that designation of the communication terminal 20 is unsolved. According to the present embodiment, such an issue can also be solved.

Note that, in the present embodiment, the video conference server 10 is an example of an information processing device. The system including the video conference server 10 and the communication terminals 20 is an example of a communication system. The session key is an example of an encryption key. The ciphertext reception unit 111 is an example of a recording unit. The ciphertext storage unit 131 is an example of a first storage unit. The session key is an example of a first encryption key. The old session key ciphertext transmission unit 119 is an example of a first transmission unit. The ciphertext transmission unit 112 is an example of a second transmission unit. The ciphertext decoding unit 264 is an example of a decoding unit. The reproduction right request reception unit 116 is an example of a second reception unit. The public key list storage unit 133 is an example of a second storage unit. The old session key ciphertext reception unit 118 is an example of a third reception unit. The old session key ciphertext division unit 120 is an example of a conversion unit.

Although the embodiment of the present invention has been described in detail above, the present invention is not limited to such a specific embodiment, and various modifications and changes can be made within the scope of the gist of the present invention described in the claims.

REFERENCE SIGNS LIST

10 Video conference server
20 Communication terminal
30 Key sharing server
100 Drive device
101 Recording medium
102 Auxiliary storage device
103 Memory device
104 CPU
105 Interface device
111 Ciphertext reception unit
112 Ciphertext transmission unit
113 Key update data reception unit
114 Re-encryption unit
115 Setup processing unit
116 Reproduction right request reception unit
117 Public key list transmission unit
118 Old session key ciphertext reception unit
119 Old session key ciphertext transmission unit
120 Old session key ciphertext division unit
131 Ciphertext storage unit
132 Server key pair storage unit
133 Public key list storage unit
134 Old session key ciphertext storage unit
211 Screen information acquisition unit
212 Video data acquisition unit
213 Audio data acquisition unit
214 Time data acquisition unit
215 Screen display position information acquisition unit
216 Data collection unit
221 Common key ciphertext generation unit
222 Function operation unit
223 Ciphertext transmission unit
231 Setup processing unit
232 Reproduction right request transmission unit
241 Key update number operation unit
242 Key update data transmission unit
251 Public key list reception unit
252 Old session key encryption processing unit
253 Old session key ciphertext transmission unit
261 Old session key ciphertext reception unit
262 Old session key decoding unit
263 Ciphertext reception unit
264 Ciphertext decoding unit
265 Reproduction unit
291 Common key storage unit
292 Session key storage unit
293 Key pair storage unit
B Bus

The invention claimed is:

1. A communication system comprising:
an information processing device that provides a video conference service; and
a plurality of communication terminals using the video conference service, said communication terminals being configured to generate communication data, encrypt the communication data and transmit the communication data to the information processing device,
wherein the information processing device includes:
a memory; and
a first processor configured to execute
recording the communication data related to a video conference encrypted and transmitted from each of the communication terminals in a first storage for each of the communication terminals;
transmitting, to the communication terminals, a ciphertext obtained by encrypting an encryption key capable of decoding each item of the communication data recorded in the first storage such that the encryption key can be decoded by the communication terminals; and transmitting the communication data recorded in the first storage to the communication terminals, and the communication terminals each include:

a memory; and a second processor configured to execute decoding the communication data for each of the communication terminals using a decoding result of the ciphertext; and reproducing video and audio included in the communication data decoded for each of the communication terminals in synchronization with each other on a basis of control data included in each of the communication data, the second processor is configured to execute synchronized reproduction of the video and audio by adjusting a reproduction start timing of the video and audio and a display position of screen sharing information, based on control metadata included in the communication data of each of the communication terminals, the control metadata including time data and a display position on a screen, wherein the first processor further executes:

when receiving a public key generated by any of the communication terminals from said any one of the communication terminals, recording the public key in a second storage;

receiving, from any of the communication terminals, the ciphertext of the encryption key encrypted using all the public key recorded in the second storage in the video conference; and converting the ciphertext such that the ciphertext can be decoded using a secret key for the public key of any of the communication terminals in response to a request from said any of the communication terminals, and transmitting the ciphertext after conversion to said any of the communication terminals.

2. The communication system according to claim 1, wherein the processor of the information processing device further executes, when the encryption key is updated, re-encrypting the communication data recorded in the first storage such that the communication data can be decoded only by an updated encryption key, and receiving the ciphertext of the encryption key at an end of the video conference encrypted using all the public key recorded in the second storage in the video conference from any of the communication terminals.

3. An information processing device that provides a video conference service to a plurality of communication terminals, said communication terminals being configured to generate communication data, encrypt the communication data and transmit the communication data to the information processing device, the information processing device comprising:

a memory; and a first processor configured to execute recording the communication data related to a video conference encrypted and transmitted from each of the communication terminals using the video conference service in a first storage for each of the communication terminals;

transmitting, to the communication terminals, a ciphertext obtained by encrypting an encryption key capable of decoding each item of the communication data recorded in the first storage such that the encryption key can be decoded by the communication terminals; and transmitting the communication data recorded in the first storage to the communication terminals, wherein the communication terminals each include:

a memory; and a second processor configured to execute decoding the communication data for each of the communication terminals using a decoding result of the ciphertext;

reproducing video and audio included in the communication data decoded for each of the communication terminals in synchronization with each other on a basis of control data included in each of the communication data, executing synchronized reproduction of the video and audio by adjusting a reproduction start timing of the video and audio and a display position of screen sharing information, based on control metadata included in the communication data of each of the communication terminals, the control metadata including time data and a display position on a screen, wherein the first processor further executes:

when receiving a public key generated by any of the communication terminals from said any one of the communication terminals, recording the public key in a second storage;

receiving, from any of the communication terminals, the ciphertext of the encryption key encrypted using all the public key recorded in the second storage in the video conference; and converting the ciphertext such that the ciphertext can be decoded using a secret key for the public key of any of the communication terminals in response to a request from said any of the communication terminals, and transmitting the ciphertext after conversion to said any of the communication terminals.

4. A communication method performed by an information processing device that includes a memory and a processor to provide a video conference service and a plurality of communication terminals, said communication terminals being configured to generate communication data, encrypt the communication data and transmit the communication data to the information processing device, said communication terminals including a memory and a processor to use the video conference service, the communication method comprising:

recording, executed by the information processing device, the communication data related to a video conference encrypted and transmitted from each of the communication terminals in a first storage for each of the communication terminals;

transmitting, executed by the information processing device, to the communication terminals, a ciphertext obtained by encrypting an encryption key capable of decoding each item of the communication data recorded in the first storage such that the encryption key can be decoded by the communication terminals; and transmitting, executed by the information processing device, the communication data recorded in the first storage to the communication terminals, and decoding, executed by each of the communication terminals, the communication data for each of the communication terminals using a decoding result of the ciphertext; and reproducing, executed by each of the communication terminals, video and audio included in the communication data decoded for each of the communication terminals in synchronization with each other on a basis of control data included in each of the communication data, wherein the communication method further comprises:

executing, executed by each of the communication terminals, synchronized reproduction of the video and audio by adjusting a reproduction start timing of the video and audio and a display position of screen sharing information, based on control metadata included in the communication data of each of the communication terminals, the control metadata including time data and a display position on a screen, when receiving a public key generated by any of the communication terminals from said any one of the communication terminals, recording, executed by the information processing device, the public key in a second storage;

receiving, executed by the information processing device, from any of the communication terminals, the ciphertext of the encryption key encrypted using all the public key recorded in the second storage in the video conference; and converting, executed by the information processing device, the ciphertext such that the ciphertext can be decoded using a secret key for the public key of any of the communication terminals in response to a request from said any of the communication terminals, and transmitting, executed by the information processing device, the ciphertext after conversion to said any of the communication terminals.

5. A non-transitory computer-readable recording medium having computer-readable instructions stored thereon, which when executed, cause a computer to function as the information processing device according to claim 3.

6. The communication system according to claim 1, wherein the processor of the communication terminal is configured to:

determine the display position or a display mode for reproducing the video and audio based on a device type of each of the communication terminals, and perform the synchronized reproduction of the video and audio by adjusting the reproduction start timing and the display position of screen sharing information, based on control metadata included in the communication data of each of the communication terminals, the control metadata including the time data and the display position on the screen.

* * * * *